March 29, 1960  J. W. KASTEN  2,930,352
ANIMAL SELF-FEEDER
Filed Oct. 31, 1958  3 Sheets-Sheet 1

INVENTOR.
JOHN W. KASTEN,
BY

McMorrow, Berman + Davidson
ATTORNEYS.

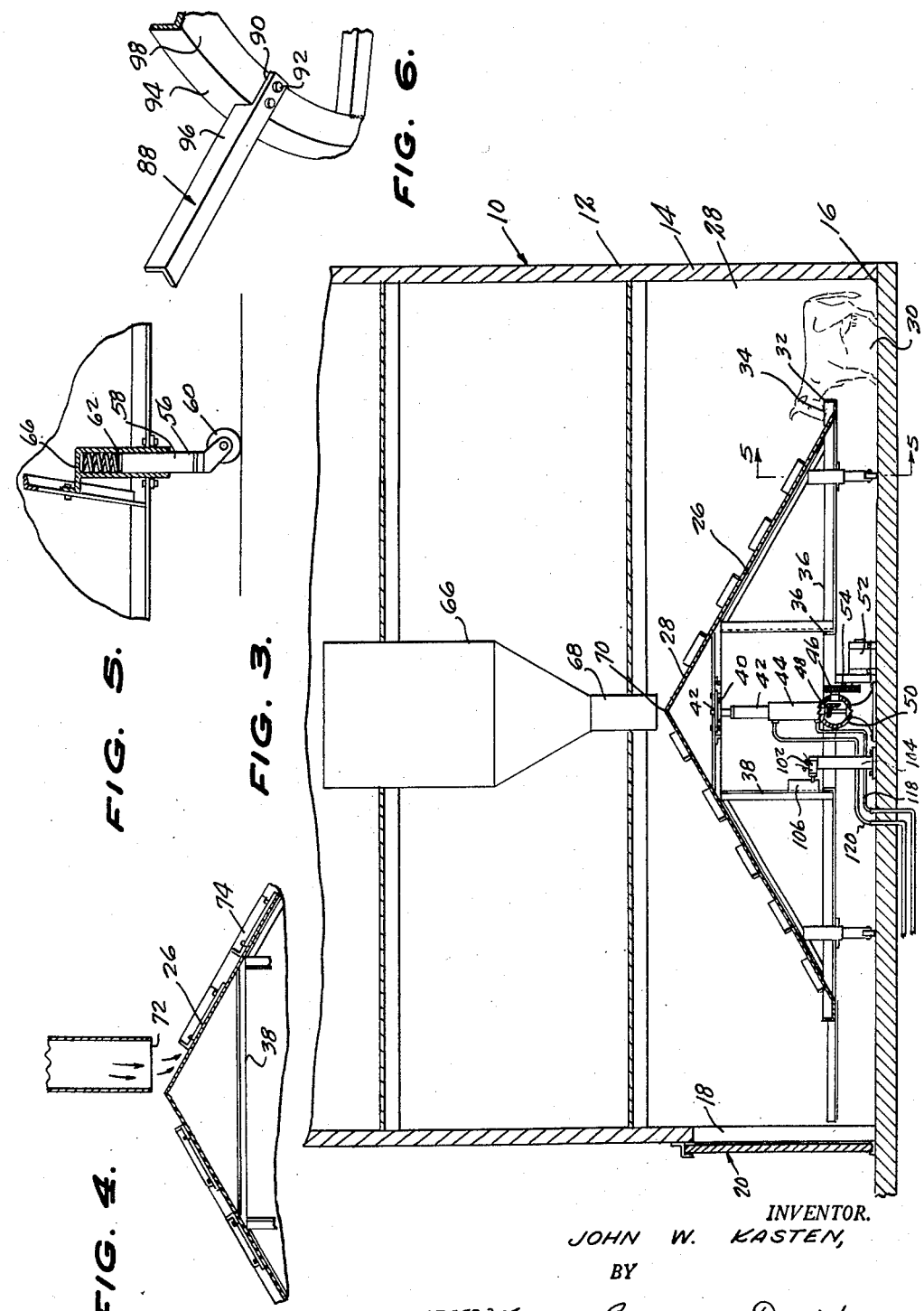

March 29, 1960  J. W. KASTEN  2,930,352
ANIMAL SELF-FEEDER
Filed Oct. 31, 1958  3 Sheets-Sheet 3
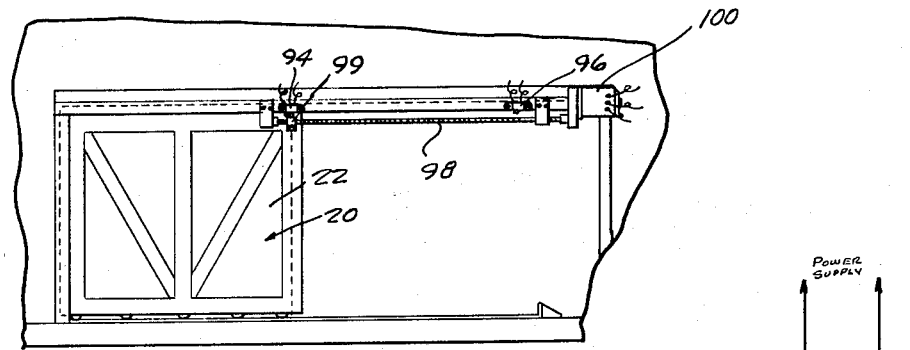
FIG. 7.
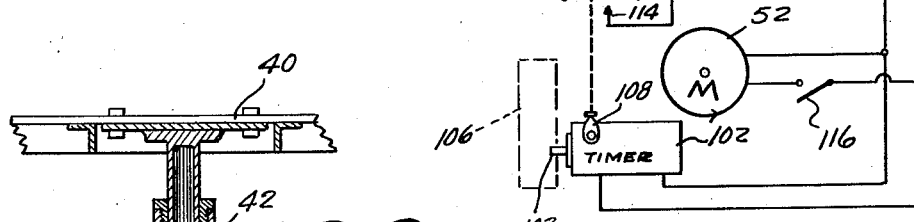
FIG. 8.
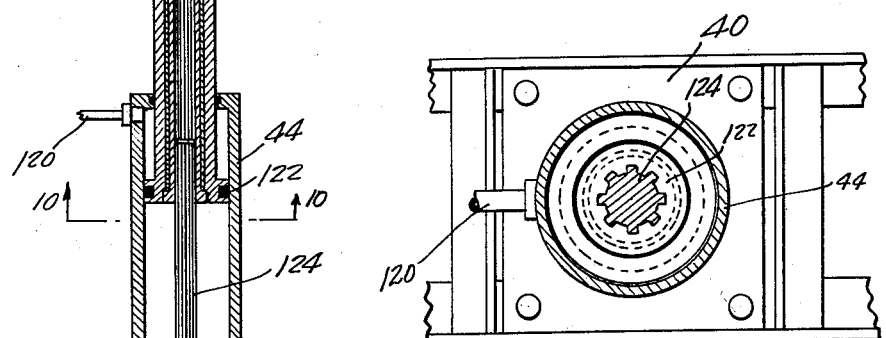
FIG. 9.
FIG. 10.
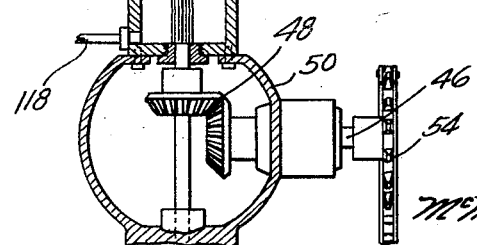
INVENTOR.
JOHN W. KASTEN,
BY
McMorrow, Berman & Davidson
ATTORNEYS.

United States Patent Office 2,930,352
Patented Mar. 29, 1960

2,930,352

ANIMAL SELF-FEEDER

John W. Kasten, Secaucus, N.J., assignor to Canyon Farms, Inc., Canisteo, N.Y., a corporation of New York Application October 31, 1958, Serial No. 770,978

15 Claims. (Cl. 119—52)

The present invention generally appertains to improvements in animal feeding devices and, in particular, relates to an improved self-feeder for animals.

A primary object of the present invention is to provide a self-feeder for animals which is operated so that the feeding time of the animals is controlled to insure proper and complete feeding of the animals.

Another important object of the present invention is to provide a self-feeder which essentially comprises an enclosure having a feed table movably mounted therein, with the feed table being spaced from the inside of the enclosure so as to define an animal walking space for the movement of the animals around the table, as they are feeding, and with means being provided for physically engaging the animals so as to prod the animals and cause them to move around the table in a time calculated manner, whereby controlled feeding is achieved.

Another important object of the present invention is to provide a rotating feed table, which is rotatably mounted within an enclosure and which is spaced from the inside of the enclosure to define the animal walking space, with the table having means radially projecting therefrom for physically engaging the animals, as the table rotates, so as to cause to the animals to continuously move, in a controlled manner, around the walking space from a combined entrance and exit of the enclosure.

A further important object of the present invention is to provide means, in operative association with the feed table, for mixing the feed, as it is deposited from an overhead supply hopper onto the table, during the rotation of the table and as the animals are feeding at a feed apron provided on the periphery of the table.

A further important object of the present invention is to provide the enclosure with an opening for the movement of the animals into and from the enclosure and to provide a closure means for the opening, the closure means being controlled by the rotary movement of the table so that when the table is in operation, the closure means closes off the opening and, when the table is stopped, the closure means uncovers the opening.

A still further object of the present invention is to provide a rotary feed table which can be adjusted to various heights depending upon the type of animals being fed and which, at any of the various selected heights, can be easily rotated so as to mix the feed and, which which is provided with means for moving the animals, irrespective of the type, around the table as it rotates.

The foregoing and ancillary objects, including the provision of an inexpensive and easily assembled self-feeding structure, which is extremely efficient in operation, are attained by this invention, the preferred embodiment of which is set forth in the following description and illustrated in the accompanying drawings, wherein:

Figure 3 is a transverse, vertical sectional view, taken substantially on line 3—3 of Figure 1;

Figure 4 is a fragmentary, vertical sectional view of the upper portion of the feed table, illustrating the operation of the mixing means, as the feed is discharged from the supply hopper onto the feed table;

Figure 5 is a detail, vertical sectional view, taken substantially on line 5—5 of Figure 3, and illustrating the supporting means for the feed table;

Figure 6 is a fragmentary, perspective view of the means, which is carried by the feed table and which is provided for physically moving the animals around the feed table, as they travel along the animal walking space between the feed table and the interior of the enclosure;

Figure 7 is a fragmentary elevational view of the closure means for the opening in the enclosure;

Figure 8 is a schematic illustration of the wiring diagram for the operation of the closure means and the feed table;

Figure 9 is an enlarged, vertical sectional view of the adjustable operating means for the feed table; and, Figure 10 is a cross-sectional view taken on line 10—10 of Figure 9.

Figure 1:
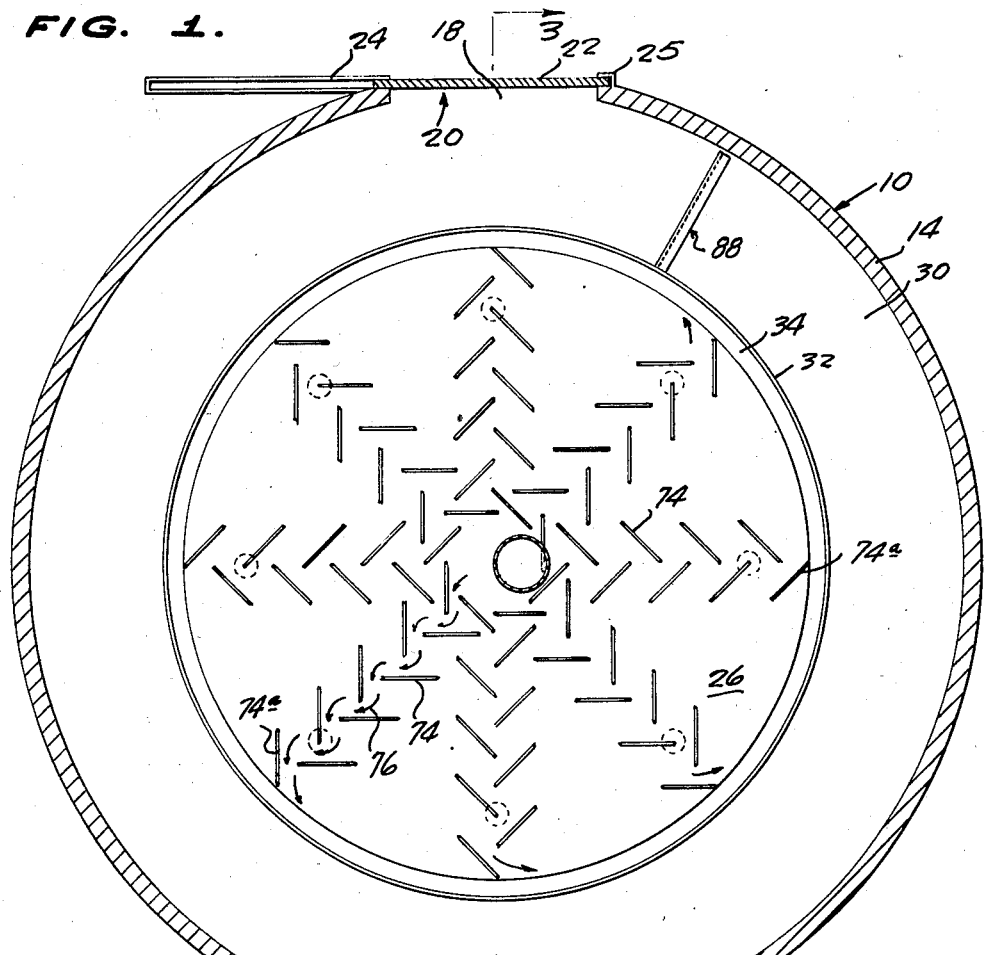
Figure 1 is a horizontal sectional view of the self-feeder structure, with the feed table shown in top plan view.

Referring now more particularly to the accompanying drawings, the reference numeral 10 generally designates the self-feeder, which includes a shell-like enclosure 12, that is of cylindrical shape and includes a cylindrical side wall 14 and a floor surface 16. The floor surface 16, which constitutes the base of the structure, may be formed from any suitable material, such as a concrete slab or the like, and the side wall of the enclosure rests on the floor surface 16. Any suitable foundation structure, which may be necessary, may be provided.

The side wall 14 is provided with an opening 18, which extends from the floor surface 16 a sufficient distance upwardly for the movement of the animals from the outside into the interior of the enclosure. The opening 18 is controlled by a closure means 20 which includes a door 22 mounted for sliding movement tangentially of the enclosure and having a guide means 24. The guide means 24 is opposed to a keeper means 25 which is positioned on the exterior of the enclosure at the opposite side of the opening from the guide means 24.

A feed table 26 is rotatably mounted within the interior of the enclosure and is spaced from the inside 28 of the side wall 14 so as to define an animal walking space 30. As shown in Figure 3, the feed table 26 includes a conical center portion 28 and an annular feed apron 29, which is provided on the lower end of the center portion and is formed with an upstanding annular rim or flange 32, so as to define the feed trough 34.

The feed table 26 is provided with reinforcing brace bars 36 that extend diametrically from various points at the bottom of the conical center portion and are arranged in crosswise fashion, as shown in Figure 3. A vertical frame 38 upstands from the brace bars, adjacent the center of the feed table, and is disposed beneath the underside of the feed table. The vertical frame supports a plate 40, that is horizontally disposed, and is connected by suitable fastening means to the upper end of a vertical shaft 42. The shaft 42 is rotatably housed in a tubular standard 44, which is mounted, at its lower end, on the floor surface 16. The shaft 42 is connected with a horizontally disposed drive shaft 46 by means of intermeshing, bevelled gears 48, which are housed in the central casing 50 in the standard.

A prime mover 52, which is an electric motor but which may be any other similar power motive means, is mounted on the floor surface and is drivingly connected to a chain 54, which is engaged with a sprocket (not shown) on the outer end of the horizontal shaft 46.

The prime mover, drive connection means, which includes the chain and sprockets, and the shafting, with the intermeshing gearing, provides the means for rotating the table within the enclosure.

As shown in Figure 3 and in detail in Figure 5, ground engaging wheel means 56 is provided for supporting the table for rotation on the floor surface 16 at any selected level of the table, as will be described. Such wheel means preferably includes spring-urged caster wheel units, which comprise shafts 58 supporting wheels 60 on their lower ends. The shafts are rotatably and slidably disposed in tubes 62, which have open lower ends and which house coil springs 64 that bear on the upper ends of the shafts 58 and against the inner closed ends 66 of the tubes. In this fashion, the wheels are spring-urged downwardly but are free to slide upwardly and to rotate, so as to follow the contour of the floor surface and, in particular, to ride over any feed that may be spilled onto the floor surface.

As the animals enter the enclosure, through the opening 18, the feed is deposited onto the table from an overhead supply hopper 66, which has a lower, funnel outlet end 68 that is spaced off-center from the apex 70 of the central portion 28 of the feed table, as shown in Figures 1 and 4. The funnel outlet end 68 is vertically disposed and is directed downwardly, with its open lower end 72 disposed slightly above the upper or minor end of the table, off-center from the apex 70.

Feed mixing means is mounted on the table for the purpose of mixing the feed, as it passes from the upper center of the table downwardly to the feed trough 34. Such means includes baffle plates 74, which are arranged in right angular relationship so as to provide a tortuous path through which the feed must fall in gravitating downwardly into the trough. The passage of the feed is aided by the rotation of the table so as to insure a thorough mixing thereof. The baffle plates are disposed diametrically on the feed table and are arranged so that an uppermost baffle plate has its lower end directed at right angles to the next lower baffle plate and spaced therefrom and directed toward a point substantially intermediate the ends of the next lower baffle plate. This is shown clearly in Figure 1.

Figure 2:
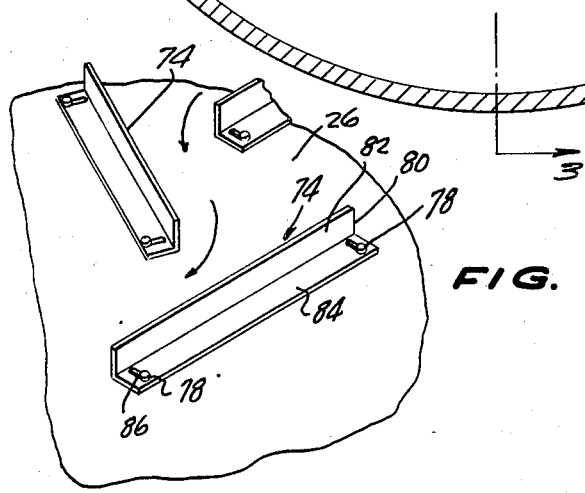
Figure 2 is an enlarged, fragmentary perspective view of a portion of the feed table, illustrating the mixing means which is provided thereon.

For the purpose of adjusting the baffle plates so as to adjust the path of movement, indicated by the numeral 76 in Figure 1, the baffle plates are adjustably mounted by fasteners 78 onto the upper surface of the central portion of the feed table. As shown in Figure 2, each baffle plate consists of an angle iron 80, which has a vertical flange 82 that upstands from the surface of the feed table and a horizontal mounting flange 84, which is formed, adjacent its opposing ends, with slots 86 arranged transverse to the long axis of the flange. The slots receive the fasteners 78, which may be in the nature of bolts and permit the plates to be bodily adjusted relative to the fastening means. Thus, the plates may be bodily moved toward and away from each other in a direction transverse to the longitudinal axis of the plates.

It is a primary object of the present invention to provide a self-feeder having a control feed means, whereby the animals are physically alerted to move around the walking space 30, as they feed from the feed trough 34. In this regard, the opening 18 is the sole opening in the enclosure and, when the animals pass around the table and see the light, entering through the opening, they immediately, by nature, pass out through the opening. In order to keep the animals moving around the walking space so as to orderly enter and leave the enclosure, an abutment means 88 is provided, which strikes or abuts the animals and prods them into movement toward the opening 18.

As shown more particularly in Figure 6, the abutment means 88 includes an elongated bar, which may be of any suitable cross-sectional shape, and which is carried by the rotating table, so as to project radially therefrom. The bar is of sufficient length to extend substantially across the walking space 30. The bar is formed with an ear 90, at its inner end, the ear being fixedly secured by fasteners 92 to the underside of the apron 29. The bar is retained in its radially projecting position by the fasteners.

The opening 18 is controlled by the closure means 20 for the controlled feeding of the animals and such closure means includes the door 22 which is mounted for sliding movement in the guide means 24 and is disposed tangentially of the side wall of the enclosure so as to close off the opening 18. The door slides in the guide means 24 and, when in a fully closed or shut position, has its outer edge received in the keeper means 25.

It is proposed that the opening 18 be covered by the closure means 20 for the admission of the animals into the enclosure and the exit of the animals from the enclosure upon the termination of one revolution of the feed table. As shown in Figures 7 and 8, the door 22 is controlled by limit switches 94 and 96, the sliding movement of the door being effected by a screw rod 98 which is driven by an electric motor 100, the screw rod 98 being threadingly received by a follower 99 which is fixed to the door.

As can be seen, in connection with Figure 7, the door 22 is opened and closed by the motor 100, which operates the rod 98 and the opening and closing movements of the door are controlled by the limit switches 94 and 96. As an important part of the present invention, it is desired that the closure means 20 be actuated at a predetermined time, constant with the rotary movement of the feed table and, for this purpose, the operation of the motor 100 is controlled by a timer 102 which is placed in operation by the rotary feed table. The timer 102 is mounted on a standard 104, within the confines of the feed table, and is adapted to be obstructed by an arm 106 that is carred by one of the vertical reinforcing frame members 38 of the feed table. As the arm 106 obstructs the actuating element of the timer 102, the timer is placed in operation with the eccentric 108 being rotated.

As shown in Figure 8, the switch arm 110 for the motor 100 is normally engaged with the contact 112 and the contact 94a of the limit switch 94 is normally open, so that an operating circuit for the motor 100 is not established. When the arm 106 strikes the switch finger 103, the timer 102 is placed in operation so that the eccentric 108 rotates and moves the switch arm 110 into engagement with the contact 114. The motor is then energized to actuate the screw rod and open the door, the door moving to the right in Figure 8. When the limit switch 96 is struck, the reverse cycle of the motor is energized and the door is moved back to the left in Figure 8 into a closed position. At this point, the eccentric has rotated back to its original, at rest, position, as shown in Figure 8, and the switch arm 110 is moved from the contact 114 into engagement with the contact 112.

The motor 52 actuates the drive mechanism for the table and is controlled by the manual switch 116 so that the rotation of the feed table may be arrested by manually opening the switch 116. When the table is stopped, the enclosure may be entered by laborers and cleaned.

It is proposed that the rotary feed table be used for various kinds of animals and, therefore, as shown in Figures 3 and 9, the height of the rotary feed table is adjustable to accommodate the various types of animals. The vertical adjustment of the rotary feed table is achieved by virtue of the construction of the operating mechanism, as shown in Figure 9, and, in this respect, a dual hydraulic cylinder arrangement, which is operated by hydraulic lines 118 and 120 that are connected to a suitable pump means (not shown) is provided. Operation of such hydraulic lifting and lowering cylinder arrangement controls the vertical adjustment of the table, with the wheel supporting means for the table being operative, in any vertical position of the table within the operating range of the cylinder arrangement, to rotatably support the table for easy and positive rotative movement within the enclosure.

As shown in Figure 9, the tubular standard 44 defines a stationary hydraulic cylinder and the hydraulic lines 118 and 120 are connected to the cylinder 44 adjacent its upper and lower ends. A piston 122 is workingly mounted in the cylinder and is attached to the lower, inner end of the tubular shaft 42, which defines a piston rod and which is connected, at its upper end, to the plate 40. The connection of the shaft 42 with the gearing 48 is effected by means of an elongated driven shaft 124 which extends from the gearing 48. The bore of the shaft 42 is axially splined, and the shaft 124 is splined, as shown in Figure 6, so that the shaft 42 is free to slide or move axially relative to the cylinder 44 while being positively engaged with the shaft 124 for rotation therewith.

Thus, the table can be vertically adjusted and, at any selected height, will be rotated by the drive mechanism, as shown and explained.

What is claimed is:

1. An animal self-feeder comprising an enclosure, a feed table housed in the enclosure and spaced from the inside thereof so that an animal walking space is provided between the table and the inside of the enclosure, means for moving the table, said enclosure having an opening for the movement of the animals into and out of the enclosure, closure means for the opening and means carried by the table and extending into the animal walking space for bodily contact with the animals to cause the animals to walk around the table.

2. An animal self-feeder comprising a stationary shell-like enclosure having a side wall and having a floor surface, a feed table rotatably housed in the enclosure, said table being horizontally disposed in spaced relation with the floor surface for movement about a vertical axis and being spaced at its outer edge from the inside of the side wall of the enclosure to define an animal walking space, said side wall of the enclosure having an opening for the movement of animals therethrough, closure means for the opening and means carried by the table and radially extending therefrom across the walking space for bodily contact with the animals to cause the animals to walk around the table.

3. An animal self-feeder comprising a stationary shell-like enclosure having a side wall and having a floor surface, a feed table rotatably housed in the enclosure, said table being horizontally disposed in spaced relation with the floor surface for movement about a vertical axis and being spaced at its outer edge from the inside of the side wall of the enclosure to define an animal walking space, said side wall of the enclosure having an opening for the movement of animals therethrough, closure means for the opening and means carried by the table and radially extending therefrom across the walking space for bodily contact with the animals to cause the animals to walk around the table, and means controlled by the rotary movement of the feed table for controlling the opening and closing movements of the closure means.

4. An animal self-feeder comprising a stationary cylindrical shell-like enclosure having a circular side wall and a floor surface, said enclosure having only a single opening which is formed through the side wall of the level of the floor surface and extends a sufficient distance above the floor level for the movement of animals therethrough, a circular feed table rotatably mounted in the enclosure and disposed in a horizontal position above the floor surface and rotatable about a vertical axis, said table being spaced at its periphery from the inside of the side wall to provide an animal walking space so that the animals can move around the table as they feed, and means carried by the table and radially extending therefrom across the walking space for bodily contacting the animals to cause them to move around the table.

5. An animal self-feeder comprising a stationary cylindrical shell-like enclosure having a circular side wall and a floor surface, said enclosure having only a single opening which is formed through the side wall at the level of the floor surface and extends a sufficient distance above the floor level for the movement of animals therethrough, a circular feed table rotatably mounted in the enclosure and disposed in a horizontal position above the floor surface and rotatable about a vertical axis, said table being spaced at its periphery from the inside of the side wall to provide an animal walking space so that the animals can move around the table as they feed, and means carried by the table and radially extending therefrom across the walking space for bodily contacting the animals to cause them to move around the table, and closure means for the opening for controlling the movements of the animals into and from the enclosure.

6. An animal self-feeder comprising a stationary cylindrical shell-like enclosure having a circular side wall and a floor surface, said enclosure having only a single opening which is formed through the side wall at the level of the floor surface and extends a sufficient distance above the floor level for the movement of animals therethrough, a circular feed table rotatably mounted in the enclosure and disposed in a horizontal position above the floor surface and rotatable about a vertical axis, said table being spaced at its periphery from the inside of the side wall to provide an animal walking space so that the animals can move around the table as they feed, means carried by the table and radially extending therefrom across the walking space for bodily contacting the animals to cause them to move around the table, closure means for the opening and means controlled by the rotary movement of the feed table for operating the closure means.

7. An animal self-feeder comprising a stationary cylindrical shell-like enclosure having a circular side wall and a floor surface, said enclosure having only a single opening which is formed through the side wall at the level of the floor surface and extends a sufficient distance above the floor level for the movement of animals therethrough, a circular feed table rotatably mounted in the enclosure and disposed in a horizontal position above the floor surface and rotatable about a vertical axis, said table being spaced at its periphery from the inside of the side wall to provide an animal walking space so that the animals can move around the table as they feed, means carried by the table and radially extending therefrom across the walking space for bodily contacting the animals to cause them to move around the table, and means for positioning the table in selected positions relative to the floor surface.

8. An animal self-feeder comprising a stationary cylindrical shell-like enclosure having a side wall and having a floor surface, a circular feed table rotatably housed in the enclosure, said table being horizontally disposed in spaced relation with the floor surface for movement about a vertical axis and being spaced at its periphery from the inside of the side wall of the enclosure to define an animal walking space, said side wall of the enclosure having an opening for the movement of animals therethrough, closure means for the opening, means rigidly carried by the table and radially extending therefrom across the walking space into adjacency with the inside of the side wall of the enclosure for bodily contact with the animals to cause the animals to walk around the table, means disposed above the table for depositing food thereon, feed mixing means mounted on the table and means for rotating the table.

9. An animal self-feeder comprising a stationary cylindrical shell-like enclosure having a side wall and having a floor surface, a circular feed table rotatably housed in the enclosure, said table being horizontally disposed in spaced relation with the floor surface for movement about a vertical axis and being spaced at its periphery from the inside of the side wall of the enclosure to define an animal walking space, means for raising and lowering the table relative to the floor surface, said side wall of the enclosure having an opening for the movement of animals therethrough, closure means for the opening, means carried by the table and radially extending therefrom across the walking space for bodily contact with the animals to cause the animals to walk around the table towards and from the opening, means for rotating the table, said table having a conical center portion and a feed trough formed around the rim of the lower end of the center portion, means for depositing feed onto the center portion of the table at the apex end of its center portion and means arranged on the table in spaced staggered relation from the apex end to the feed trough providing a tortuous path for the gravitational travel of the feed down into the trough so as to mix the feed as the table is rotated.

10. An animal self-feeder comprising a stationary cylindrical shell-like enclosure having a side wall and having a floor surface, a circular feed table rotatably housed in the enclosure, said table being horizontally disposed in spaced relation with the floor surface for movement about a vertical axis and being spaced at its periphery from the inside of the side wall of the enclosure to define an animal walking space, said side wall of the enclosure having an opening disposed at the level of the floor surface and extending a sufficient distance above the floor surface for the movement of animals therethrough, closure means for the opening, means carried by the table and radially extending therefrom across the walking space for bodily contact with the animals to cause the animals to walk around the table towards and from the opening, said last means including a bar extending outwardly radially from the table.

11. An animal self-feeder comprising a stationary cylindrical shell-like enclosure having a side wall and having a floor surface, a circular feed table rotatably housed in the enclosure, said table being horizontally disposed in spaced relation with the floor surface for movement about a vertical axis and being spaced at its periphery from the inside of the side wall of the enclosure to define an animal walking space, said side wall of the enclosure having an opening disposed at the level of the floor surface and extending a sufficient distance above the floor surface for the movement of animals therethrough, means carried by the table and radially extending therefrom across the walking space for bodily contact with the animals to cause the animals to walk around the table from and towards the opening, said last means including a bar extending outwardly radially from the table and connected to the table.

12. An animal self-feeder comprising a stationary cylindrical shell-like enclosure having a side wall and having a floor surface, a circular feed table rotatably housed in the enclosure, said table being horizontally disposed in spaced relation with the floor surface for movement about a vertical axis and being spaced at its periphery from the inside of the side wall of the enclosure to define an animal walking space, said side wall of the enclosure having an opening disposed at the level of the floor surface and extending a sufficient distance above the floor surface for the movement of animals therethrough, means carried by the table and radially extending therefrom across the walking space for bodily contact with the animals to cause the animals to walk around the table from and towards the opening, said last means including a bar extending outwardly radially from the table and connected to the table, closure means for the opening and means actuated by the rotary motion of the table for controlling the opening and closing movements of the closure means.

13. An animal self-feeder comprising a stationary cylindrical shell-like enclosure having a side wall and having a floor surface, a circular feed table rotatably housed in the enclosure, said table being horizontally disposed in spaced relation with the floor surface for movement about a vertical axis and being spaced at its periphery from the inside of the side wall of the enclosure to define an animal walking space, said side wall of the enclosure having an opening disposed at the level of the floor surface and extending a sufficient distance above the floor surface for the movement of animals therethrough, means carried by the table and radially extending therefrom across the walking space for bodily contact with the animals to cause the animals to walk around the table from and towards the opening, said last means including a bar extending outwardly radially from the table and connected to the table, and means for raising and lowering the table relative to the floor surface.

14. An animal self-feeder comprising a stationary cylinder shell-like enclosure having a side wall and having a floor surface, a circular feed table rotatably housed in the enclosure, said table being horizontally disposed in spaced relation with the floor surface for movement about a vertical axis and being spaced at its periphery from the inside of the side wall of the enclosure to define an animal walking space, said side wall of the enclosure having an opening disposed at the level of the floor surface and extending a sufficient distance above the floor surface for the movement of animals therethrough, means carried by the table and radially extending therefrom across the walking space for bodily contact with the animals to cause the animals to walk around the table from and towards the opening, said last means including a bar extending outwardly radially from the table and connected to the table, and means controlling the movements of the animals through the opening.

15. An animal self-feeder comprising a stationary cylindrical shell-like enclosure having a side wall and having a floor surface, a circular feed table rotatably housed in the enclosure, said table being horizontally disposed in spaced relation with the floor surface for movement about a vertical axis and being spaced at its periphery from the inside of the side wall of the enclosure to define an animal walking space, said side wall of the enclosure having an opening disposed at the level of the floor surface and extending a sufficient distance above the floor surface for the movement of animals therethrough, means carried by the table and radially extending therefrom across the walking space for bodily contact with the animals to cause the animals to walk around the table from and towards the opening, said last means including a bar extending outwardly radially from the table and connected to the table, and means for adjusting the table in accordance with the height of the feeding animals.

References Cited in the file of this patent

UNITED STATES PATENTS

| 2,358,000 | Cornell | Sept. 12, 1944 |
| 2,489,438 | Schrader | Nov. 29, 1949 |
| 2,663,282 | Ingle | Dec. 22, 1953 |
| 2,705,474 | Siciliano | Apr. 5, 1955 |
| 2,745,380 | Vanes | May 15, 1956 |
| 2,814,271 | Black | Nov. 26, 1957 |

FOREIGN PATENTS

| 453,262 | France | Mar. 31, 1913 |